United States Patent [19]

Smith

[11] 4,044,784

[45] Aug. 30, 1977

[54] WALKING AID CANE

[76] Inventor: Alfred A. Smith, 13114 Margate St., Van Nuys, Calif. 91401

[21] Appl. No.: 662,525

[22] Filed: Mar. 1, 1976

[51] Int. Cl.$^2$ ........................ A45B 1/00; F16M 13/08

[52] U.S. Cl. .......................................... 135/67; 135/75

[58] Field of Search ..................... 135/45 R, 45 A, 54, 135/67, 75

[56] References Cited

U.S. PATENT DOCUMENTS

| | | | |
|---|---|---|---|
| 1,802,323 | 4/1931 | Aulmann | 135/45 R |
| 2,195,034 | 3/1940 | Miller | 135/49 |
| 2,208,195 | 7/1940 | Paul | 135/49 |
| 2,244,869 | 6/1941 | Everest et al. | 135/49 |
| 2,642,074 | 6/1953 | Pedley et al. | 135/45 R |
| 2,785,731 | 3/1957 | Welsh | 135/45 A |
| 3,289,685 | 12/1966 | Parker | 135/45 R |
| 3,550,602 | 12/1970 | Hesterman et al. | 135/45 R |

FOREIGN PATENT DOCUMENTS

| | | | |
|---|---|---|---|
| 1,166,991 | 6/1958 | France | 135/45 R |

*Primary Examiner*—Werner H. Schroeder
*Assistant Examiner*—Conrad L. Berman
*Attorney, Agent, or Firm*—George F. Smyth

[57] ABSTRACT

A low profile, low center of gravity walking aid cane construction with a central support member having its lower end rigidly connected to four legs. The four legs each have a body portion and a foot portion with the body portions positioned generally transverse to the support member and with the foot portions of the legs depending downwardly from the outer ends of the body portions for contact with a supporting surface. The extremities of the foot portions lie in a plane that is generally transverse to the support member and the extremities are positioned generally at the corners of a rectangle within this plane. The inner legs which terminate at the inner corners of the rectangle are shorter than the legs which terminate at the outer corners and support means provide support for supported lengths of the body portions of the legs. The support means is shaped and positioned to provide unsupported lengths of the body portions of the legs which have a substantially equal resistance to bending forces.

16 Claims, 5 Drawing Figures

WALKING AID CANE

BACKGROUND OF THE INVENTION

With the increases in life expectancy which have resulted from medical advances, a larger proportion of the world's population lives to an advanced age. As a result, there are now a larger proportion of aged and infirm people than there were previously.

Aged or infirm persons have needs which are different than those of the general population. In particular, aged and infirm persons may frequently require the assistance of a special device in order to walk with safety. Among such devices, which are known to the prior art, are walking aid canes in which the base of the cane is broadened by the addition thereto of four legs which provide a firmer base for the cane to prevent the user from falling.

In previous walking aid canes, the leg members of the cane have generally projected upwardly and inwardly at an angle from a supporting surface with the leg members connected at their upper ends to an upwardly extending central support post. The legs of such canes formed what may be termed a pyramidal configuration. While such canes have been somewhat satisfactory, they have suffered from a number of drawbacks. With the cane legs forming a pyramidal configuration, the center of gravity of the cane is relatively high so that the cane may be tipped over to permit falling of the user. Further, the pyramidal configuration of the cane legs has interfered with the user's foot and leg movements with the user's foot in close proximity to the cane.

To avoid interference of the cane with his foot movement, the user may be forced to position the cane away from his body. This is generally unsatisfactory since the supporting force provided by the cane is then not directed upwardly in a straight line through the user's arm and shoulder. Rather, the supporting force provided by the cane will be angled upwardly in a direction toward the user's body such that the force applied by the user to the cane will have a side force component directed away from the user's body. The side force component will have a tendency to tip the cane and to permit the user to fall.

A further disadvantage of previous walking aid canes is that the handle member of the cane is restricted in its vertical positioning by a vertically elevated connection point between the upper end of the inwardly angled cane legs and the cane support member. The handle member of the cane will, generally, be mounted in telescoping relation with respect to the cane support member. However, due to the vertically elevated connection point between the cane legs and support member, the downward adjustment of the handle member is limited by the vertically elevated connection point which prevents downward movement of the handle member beyond this point. Additionally, in walking aid canes of the prior art, the inwardly angled position of the cane legs has limited the extent of frictional engagement between legs and a supporting surface.

In providing a solution to the deficiencies of previous walking aid canes, it would be desirable to have a walking aid cane in which the configuration of the leg members provided a cane with a very low center of gravity. Such a cane would be more difficult to tip over and would, thus, provide firmer support to an aged or infirm user. Also, it would be desirable to provide a walking aid cane in which the shape and position of the leg members was such that the cane could be placed more closely adjacent to the user's foot and leg without intefering with the user's movements. Such a cane would be safer since there would be less tendency for the user to trip and to fall.

It would also be desirable to provide a walking aid cane in which the cane legs make contact with a supporting surface over a larger frictional area. Such a cane would provide greater frictional engagement between the extremities of the legs and a supporting surface to prevent slippage of the cane with respect to the supporting surface. Additionally, it would be desirable to have a walking aid cane in which the handle member could be vertically adjusted with respect to a support member without interference from the cane legs and their point of connection to the cane support member. Such a cane would provide greater adjustability of the handle member so that the cane could be more readily accommodated to users of various height.

SUMMARY OF THE INVENTION

In providing a solution to the aforementioned problems, the present invention provides a walking aid cane with a lower center of gravity and a lower profile than those of previous walking aid canes. Moreover, the configuration of the leg members of the present walking aid can permit the user to place his foot and leg closely adjacent to the base of the cane without interference from the cane. The shape and position of the leg members in the present cane permit the handle member for the cane to be vertically adjusted through a greater distance with respect to a support member without interference from the leg members. Still further, in the present cane the leg members make contact with a supporting surface over a greater frictional surface area.

The present walking aid cane construction includes a central support member having an upper end, a lower end, and a longitudinal axis with the support member being rigidly connected at its lower end to four legs which are shaped and positioned to make contact with a supporting surface. Each of the cane legs has a body portion and a foot portion with the body portions of the legs being generally transversely connected to the support member and with the foot portions depending downwardly from the outer ends of the body portions.

The support member has an inner region which faces the user's leg and an outer region that faces away from the user's leg. Additionally, the foot portions of the legs have lower ends which are positioned in a plane that is generally transverse to the axis of the support member with the lower ends being generally positioned at the corners of a rectangle within the plane. The support member also has a front region which faces generally in the direction of movement of the user and a rear region which faces generally in a reverse direction.

The rectangle which is formed within the transverse plane has a front side and a rear side which are generally parallel to each other and are generally transverse to the direction of movement of the user. The rectangle also has an inner side and an outer side which are generally parallel and are in general alignment with the direction of movement of the user. The inner side of the rectangle is positioned closer to the axis of the support member than the outer side while the front side and rear side of the rectangle are each positioned at about the same distance from the longitudinal axis of the support member.

The rectangle has inner corners which are formed by the intersection of the inner side with the front and rear sides and outer corners which are formed by intersection of the outer side of the rectangle with the front and rear sides. The inner cane legs each terminate at the inner corners of the rectangle while the outer cane legs terminate at the outer corners. The inner cane legs are generally shorter than the outer legs with the outer cane legs providing a greater resistance to tipping of the walking aid cane.

To accommodate the greater bending forces which may be experienced by the longer outer cane legs, support means strengthen the supported lengths of the body portions of the inner and outer cane legs. The support means is shaped and positioned to provide unsupported lengths of the body portions of the inner and outer cane legs which have substantially equal strength in bending. Thus, the present cane is very strong and rigid in its construction; however, it is also relatively light in weight so that it can be easily lifted by an aged or infirm person.

Preferably, the present cane construction provides a support means for the cane legs which includes a plate that contacts the cane legs along the supported lengths of the body portions of the legs. The plate may include a flange which is connected to the support member for the cane with the support member passing through the flange. To provide support for the inner and outer cane legs which generally equalizes the resistance of the legs to bending forces, the support plate may have a trapezoidal configuration in which opposite sides of the plate are generally parallel and in general alignment with the direction of movement of the cane user. The cane leg members, the plate which contacts the body portions of the legs, and the support post for the cane are preferably connected together to form a rigid integral structure by any suitable means such as brazing.

BRIEF DESCRIPTION OF THE DRAWINGS

In describing the present walking aid cane by reference to a preferred embodiment thereof, reference is made to the accompanying drawings in which.

DETAILED DESCRIPTION

Figure 1:
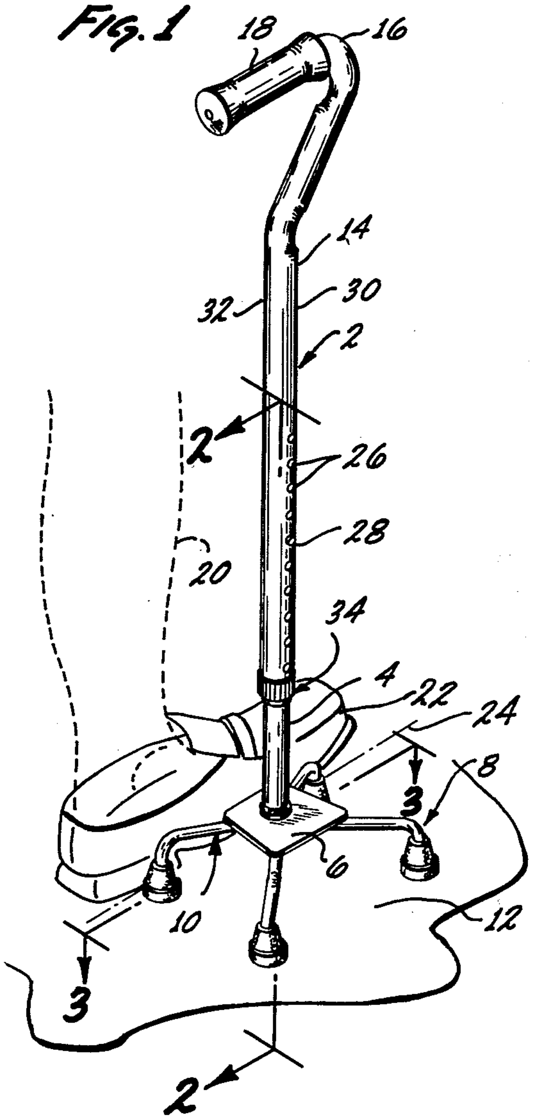
FIG. 1 is a pictorial view of a walking aid cane positioned on a supporting surface with the user's leg and foot being positioned closely adjacent to the base of the cane.

As illustrated in FIG. 1, a walking aid cane 2 of the invention includes a support member 4 which is rigidly secured to a trapezoidal plate 6. Secured to the support member 4 and to the trapezoidal plate 6 are a pair of outer legs 8 and a pair of inner legs 10 which are illustrated as being in contact with a supporting surface 12.

A handle member 14 is adjustably secured to the support member 4 with the handle member including a curved handle portion 16 formed at its upper end with a handle grip 18 positioned on the handle portion. In usage, a user's leg 20 and foot 22 are positioned closely adjacent to the inner legs 10 with the user's foot and walking aid cane 2 positioned in general alignment with a line of movement 24 of the user. In providing adjustability of the handle member 14, a plurality of holes 26 may be formed in the handle member with the holes being selectively engageable by a spring-biased detent 28 which is positioned on support member 4 in a manner to be described.

The handle member 14 includes a front region 30 and a rear region 32 with the front region generally facing in the direction of movement 24 while the rear region generally faces away from the direction of movement. A swivel lock, generally indicated as 34, releasably secures the handle member 14 to the support member 4 in a manner to be described. By releasing the swivel lock 34 and depressing the detent 28, the handle member 14 may be moved upwardly or downwardly with respect to support member 4 to vary the height of curved handle portion 16 and handle grip 18 with respect to supporting surface 12. The position of handle member 14 may, thus, be varied to suit the height of the user. After adjusting the position of handle member 14 to its desired height, the detent 28 is then engaged with a new hole 26 and the swivel lock 34 is tightened to fix the position of the handle member in its new position relative to support member 4.

As illustrated in FIG. 1, the walking aid cane 2 is positioned immediately adjacent to the right leg 20 and foot 22 of the user with the handle member 14 in position to be grasped by the user's right hand. The walking aid cane 2 is, thus, positioned to be used as a right-handed cane. By releasing swivel lock 34 and depressing detent 28, the handle member 14 may be rotated 180 degrees with respect to support member 4. After being rotated, the handle member 14 may, then, be secured in its new position by engaging the detent 28 with a hole 26 and tightening the swivel lock 34 to fix the position of the handle member with respect to support member 4. In its new position, the curved handle portion 16 faces opposite to its position in FIG. 1 and the walking aid cane 2 has been converted to a left-handed walking aid cane.

When used as a left-handed walking aid cane, the user's left foot and leg are placed immediately adjacent to handle member 14 with the user's foot positioned opposite to that shown in FIG. 1 and with the foot pointing generally along line of movement 24. When used as a left-handed walking aid cane, the user's left foot is placed close to inner legs 10 with the user's left hand grasping the handle grip 18 for support.

In previous walking aid canes, the leg members of the cane generally projected upwardly at an angle from the supporting surface and were connected at their upper ends to an upwardly extending support post. The legs, thus, formed what may be termed a pyramidal configuration.

As compared with previous walking aid canes in which the leg members formed a pyramidal configuration, the present walking aid cane 2 has a lower center of gravity and a lower profile that is provided by the interconnection of outer legs 8, inner legs 10, and trapezoidal plate 6. By reason of its lower center of gravity, the present walking aid cane 2 has less tendency to tip and provides firmer support to an aged or infirm person. Also, by having a lower profile than previous walking aid canes, the present walking aid cane 2 enables the user to place his foot very close to the cane's inner legs 10 during usage. This is advantageous in positioning the walking aid cane 2 beneath the user's downwardly extending arm when his hand grasps the handle grip 18. In contrast thereto, with previous walking aid canes, the cane was positioned a further distance from the user's body to accommodate the space occupied by the pyramidal configuration of the cane legs. This was not entirely satisfactory since the user's downwardly extending arm had to be angled outward from the user's body in grasping the cane. The support provided by the cane was, thus, not positioned in alignment with the user's arm and shoulder.

With the low profile provided by the walking aid cane 2, as compared with previous canes having cane legs with a pyramidal configuration, the user is able to get his foot closer to the upstanding support member 4 and handle member 14. This occurs because there is less interference from the inner cane legs 10 than with the legs of previous canes which were positioned in a pyramidal configuration. In previous canes, the pyramidal arrangement of the legs could cause interference with the user's leg and foot movements which made the canes more difficult to use with safety.

A further advantage of the walking aid cane 2 is that its low profile provides greater vertical adjustability of the handle member 14 with respect to support member 4. In previous walking aid canes with legs forming a pyramidal configuration, the upper extremities of the legs have been connected to a support member at a vertically elevated point. The vertically elevated connection point limited the extent of downward movement of a handle member connected to the support member.

In the present walking aid cane 2, the downward adjustment of handle member 14 with respect to support member 4 is unobstructed by the connection of legs 8 and 10 to the support member. The low profile of legs 8 and 10, coupled with the near proximity of the plate 6 to the supporting surface 12, permits the handle member 14 to be moved downwardly along essentially the full length of support member 4. This, then, permits greater adjustment in the height of the handle member 14 in accommodating the walking aid cane 2 to users by varying its height.

Figure 2:
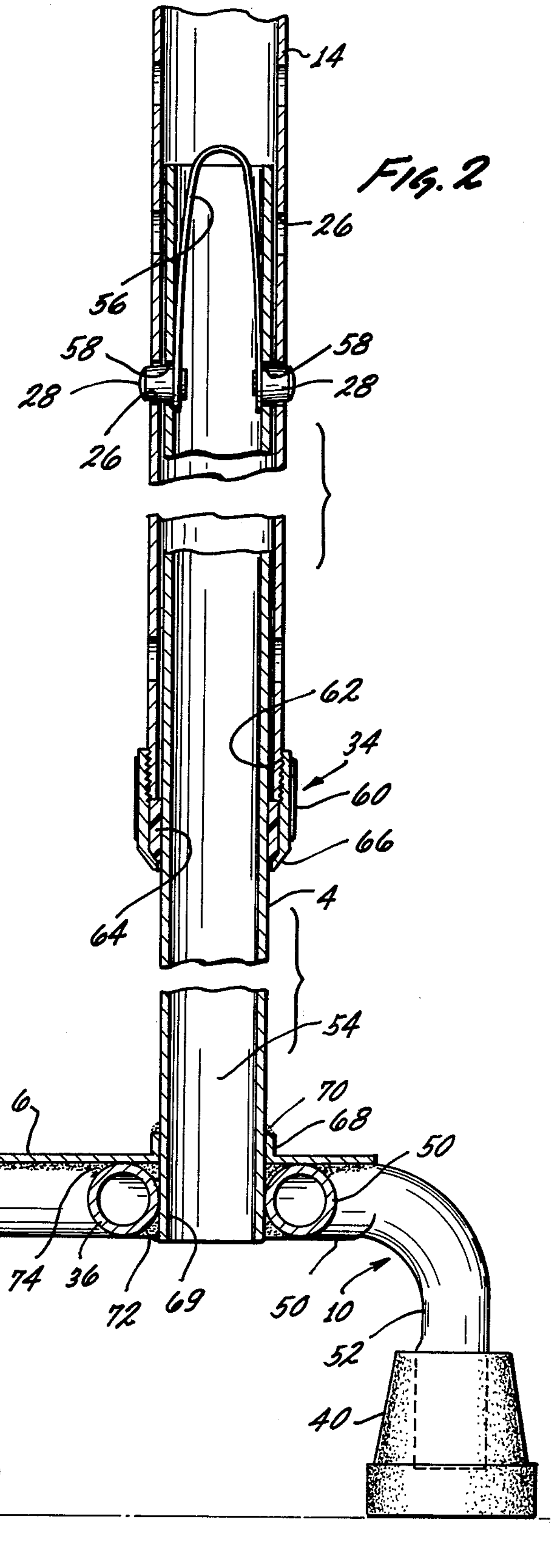
FIG. 2 is a sectional view through the walking aid cane of FIG. 1 taken along line 2—2 which illustrates the rigid integral construction of the cane base.

Turning to FIG. 2, which is a sectional view taken along line 2—2 of FIG. 1, the outer legs 8 each include a body portion 36 that is positioned in a generally transverse direction with respect to the support member 4 and a foot portion 38 which extends downwardly from the body portion to contact the supporting surface 12. A foot member 40 having an upwardly directed axial opening 42, and an undercut portion 44 is secured to each of the foot portions 38. The foot members 40 may be formed of rubber or a similar resilient material with a support insert 46 placed within undercut portion 44 to contact the lower extremity of the foot portion 38. The support insert 46 may be in the form of a flat metal disc which makes contact with the lower extremity of foot portion 38 to prevent the lower extremity from digging into or abrading the soft material of the foot member 40.

The foot member 40 may be formed with a gripping groove 48 in its lower surface which contacts the supporting surface 12. By reason of the soft resilient nature of the foot member 40 coupled with the gripping action of gripping groove 48, the foot members make firm engagement with the supporting surface 12. This prevents slippage between the walking aid cane 2 and the supporting surface 12 to provide a firm and positive support for an aged or infirm user.

As illustrated, the inner legs 10 are formed in a generally similar manner to outer legs 8 with each of the inner legs including a body portion 50 and a foot portion 52. The body portions 50 of inner legs 10 are positioned generally transverse to the direction of support member 4 while the foot portions 52 each extend downwardly from a body portion into contact with the supporting surface 12. Foot members 40, as described, are also connected to the lower extremities of foot portions 52 to provide firm, non-sliding contact between the foot portions and supporting surface 12.

The support member 4, which is illustrated as a hollow metal tube, has an axis 54 with the support member projecting upwardly and being telescopically retained within the hollow tubular handle member 14. The detent 28 may be positioned with respect to support member 4 by a loop spring 56 that is positioned in a compressed state within hollow support member 4. The detents 28 may be secured in any suitable manner to each of the ends of loop spring 56 with the detents being retained within oppositely aligned apertures 58 in the wall of the support member 4. When the oppositely positioned holes 26 in the handle member 14 are, then, aligned with the detents 28, the detents project outwardly through the holes to fix the position of the handle member with respect to support member 4. In adjusting the position of the handle member 14 with respect to support member 4, the detents 28 are depressed and the handle member is moved vertically to a new position with the ends of the detents sliding against the inner wall of the handle member as it is moved.

The swivel lock 34 which, with the detents 28, fixes the position of handle member 14 with respect to support member 4, includes an internally threaded sleeve 60 in threaded engagement with an externally threaded portion 62 on the lower end of handle member 14. As illustrated, the sleeve 60 is positioned in spaced annular relation to the external surface of support member 4 with an annular compressible member 64 positioned between the sleeve and support member. The lower end of sleeve 60 includes a contracted portion 66 which fits closely about the exterior surface of support member 4 to retain compressible member 64 between the inner surface of the sleeve and the exterior surface of the support member. As the sleeve 60 is threaded onto threaded portion 62, the contracted portion 66 bears against compressible member 64 which expands in a radially inward direction during contraction to tightly grip the exterior surface of support member 4. In this manner, the handle member 14 is fixedly positioned by the detents 28 and swivel lock 34 with respect to support member 4.

In forming a strong unitary structure, the trapezoidal plate 6 includes an upwardly directed flange 68 which surrounds the support member 4. As illustrated, the support member 4 includes a lower end 69 which projects downwardly through flange 68 with the support member being fixedly secured to the flange by means of brazing 70. The body portions 36 of the outer legs 8 may be interconnected to form a generally V-shaped structure while the body portions 50 of inner legs 10 are likewise interconnected to form a generally V-shaped construction. The interconections of body portions 36 and body portions 50 may then be placed in contacting relation with the outer surface of lower end 69 and also with the undersurface of trapezoidal plate 6 with the interconnections of body portions 36 and 50 then being fixedly secured to the lower end of the support member and to the trapezoidal plate by brazing 72 and 74.

Figure 3:
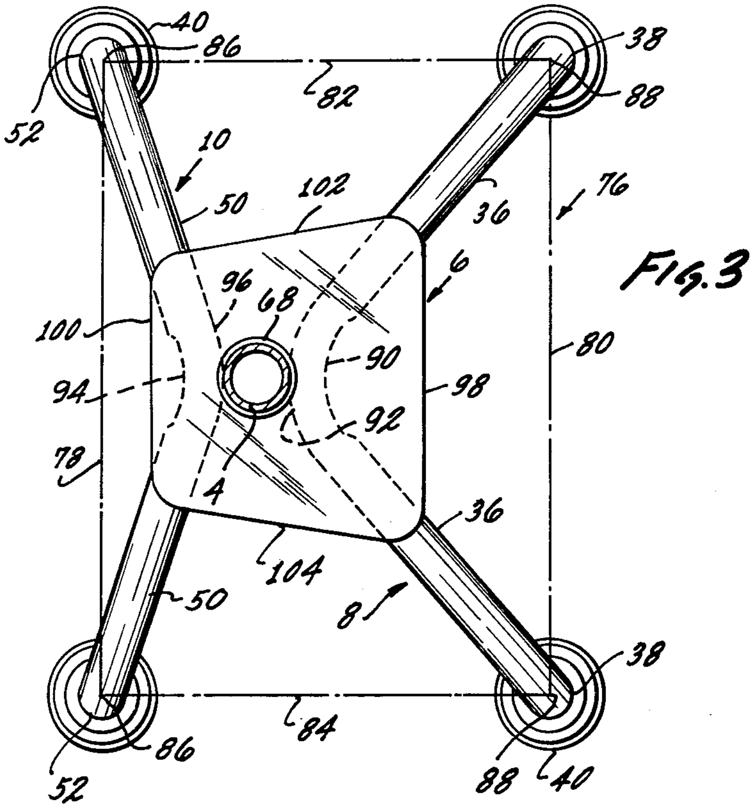
FIG. 3 is a sectional view taken along line 3—3 of FIG. 1 and illustrating the relationship between the inner cane legs, the outer cane legs, and a trapezoidal supporting plate which contacts the legs to provide the legs with generally equal strength in bending.

Turning to FIG. 3, which is a sectional view taken along line 3—3 of FIG. 1, the foot members 40 may be positioned generally at the corners of a rectangle indicated as 76. The rectangle 76 has an inner side 78 that is positioned adjacent the user's foot as indicated in FIG. 1. Additionally, the rectangle 76 has an outer side 80 which is positioned away from the user's foot, a front side 82 which faces in the direction of the user's movement when the walking aid cane is used as a right-handed cane, and a rear side 84 which, then, faces away from the direction of the user's movement. When the walking aid cane is used as a left-handed cane, the front side 82 and rear side 84 are interchanged such that the front side becomes the rear side and the rear side becomes the front side.

The rectangle 76 includes inner corners 86 which correspond to the position of the foot members 40 mounted on inner legs 10 and outer corners 88 which correspond to the position of the foot members 40 mounted on outer legs 8. The outer legs 8, as described, may be formed integrally with the individual legs being joined together by a curved interconnecting portion 90 having an inner curved surface 92 which may contact the outer surface of support member 4 in forming an integral structure. Similarly, the inner legs 10 may be formed integrally with the individual inner legs being joined by a curved interconnecting portion 94 having a curved inner surface 96. The curved inner surface 96 may also contact the exterior of support member 4 in forming a rigid integral structure as illustrated in FIG. 2.

The trapezoidal plate 6, as shown in FIG. 3, has an outer side 98 which is positioned away from the user and an inner side 100 which is positioned adjacent to the user. The outer side 98 and the inner side 100 are generally parallel. Additionally, the trapezoidal plate 6 includes a front side 102 and a rear side 104 which are not parallel to each other. As indicated, the outer legs 8 are longer than the inner legs 10 and the outer legs are positioned at a different angle than the inner legs with respect to support member 4.

During usage of the walking aid cane, the greater length of the body portions 36 of outer legs 8 and the greater transverse distance between the foot portions 38 and the plane of the user's movement passing through the axis 54 of support member 4 provides side support for the user to increase the tipping resistance of the walking aid cane in a direction away from the user's body and to, thereby, increase the user's stability. During usage, the inner legs 10 are positioned closely adjacent to one of the user's feet while the user is supported by his other foot and by the walking aid cane. Thus, there is little tendency for the user to fall in a direction away from the walking aid cane. However, the user's body does not provide assistance in preventing falling in the direction of the walking aid cane. Thus, such support must be provided by the cane itself. By positioning the outer corners 88 a greater distance from the support member 4 than the inner corners 86, the walking aid cane has a greater resistance to tipping in the direction of outer side 80 than it has against tipping in the direction of inner side 78.

By making the outer legs 8 longer than inner legs 10 to provide a greater resistance to tipping in the direction of the outer side 80, problems may be encountered in the structural integrity of the walking aid cane. It is desirable that the walking aid cane be very rigid and sturdy to provide firm support for aged and infirm users. However, it is also necessary that the walking aid cane be relatively light in weight so that it can easily be lifted. These design criteria are difficult to reconcile, particularly in the present walking aid cane which has a low profile and a low center of gravity. This is so because the relatively long length of the body portions 36 of outer legs 8 provide less resistance to bending. While this could be compensated for by making the longer outer legs 8 of heavier material than the shorter inner legs 10, this would tend to defeat the design criteria that the walking aid cane be relatively light in weight.

To provide the outer legs 8 with substantially the same resistance to bending as the inner legs 10, the trapezoidal plate 6 may be shaped to give greater support to the longer outer legs than to the shorter inner legs. The portion of the outer legs 8 shown in phantom line drawing lies beneath the trapezodial plate 6 and is rigidly connected to the plate through any suitable means such as brazing. Similarly, the portion of the inner legs 10 shown in phantom line drawing is rigidly connected to the trapezoidal plate 6. Due to the shape of the plate 6, the unsupported lengths of the body portions 36 of outer legs 8 have substantially the same length as the unsupported lengths of the body portions 50 of inner legs 10. The outer legs 8 and inner legs 10, thus, have approximately the same resistance to bending when the inner and outer legs are formed of the same material and have the same cross sectional area. This is advantageous since it provides a walking aid cane which is strong and is quite resistant to bending forces imposed by the user on the body portions 36 of outer legs 8. However, at the same time, this high strength is achieved without unduly increasing the weight of the walking aid cane. Thus, the cane is relatively light and may be easily handled by an aged or infirm person.

Figure 4:
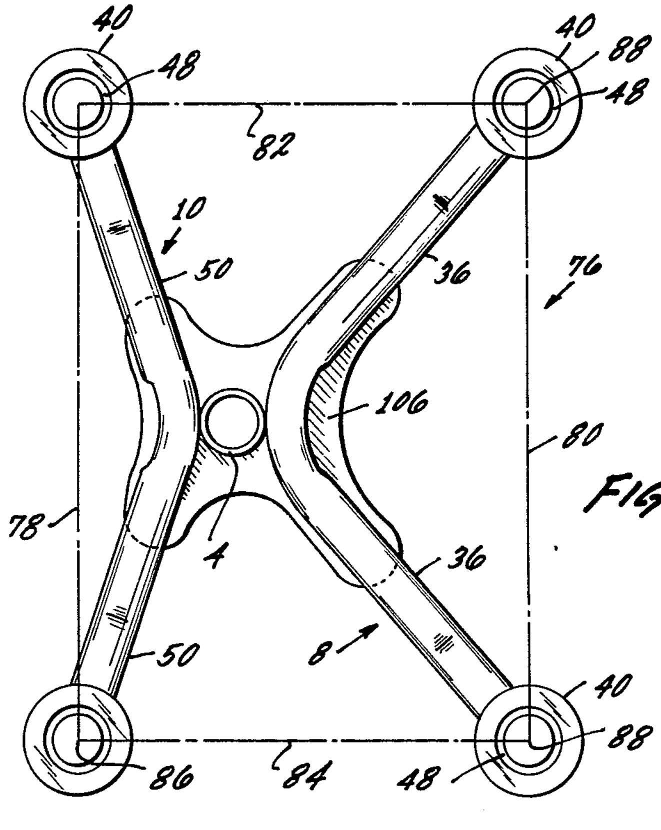
FIG. 4 is a bottom view of a further embodiment of a walking aid cane in which a support plate for the inner and outer legs has an irregular configuration to reduce the weight of the support plate while retaining its strength.

FIG. 4 is a bottom view of a further embodiment of a walking aid cane in which like reference numerals are used to describe like structural elements. As indicated, the support for the body portions 50 of inner legs 10 and the body portions 36 of outer legs 8 is provided by an irregular shaped support plate 106. The irregular shaped plate 106 is rigidly connected to inner legs 10 and outer legs 8 in the same manner as trapezoidal plate 6 of FIG. 3. The irregular shaped support plate 106 also functions in the same general manner as trapezoidal plate 6 to, in general, equalize the resistance of the outer legs 8 and inner legs 10 to bending. By having an irregular shape, the plate 106 provides the same structural effect as trapezoidal plate 6 but does so at a lesser weight penalty. The trapezoidal plate 6 includes some material and, thus, some weight which is not essential to its function; however, the irregular shape of support plate 106 eliminates any material and weight which is not directly concerned with its function in supporting the inner legs 10 and outer legs 8.

In the embodiments of the invention described in FIGS. 1 through 4, the size and shape of inner legs 10 and outer legs 8 place the foot members 40 at the corners of a rectangle, as illustrated by rectangle 76, which will fit easily on a stair step, i.e., the length of inner side 78 and outer side 80 is less than the depth of a stair step. Such a construction is desirable since it permits the use of the walking aid cane while ascending or descending steps. In a slightly different embodiment of the invention shown in pictorial view in FIG. 5, the extremities of outer legs 112 and inner legs 114 define a rectangle which has a larger dimension than the rectangle 76 shown in FIGS. 3 and 4. The walking aid cane of FIG. 5 is not designed to be used on steps; however, the larger size of the rectangular base provided by outer legs 112 and inner legs 114 offers greater stability on surfaces other than steps.

Figure 5:
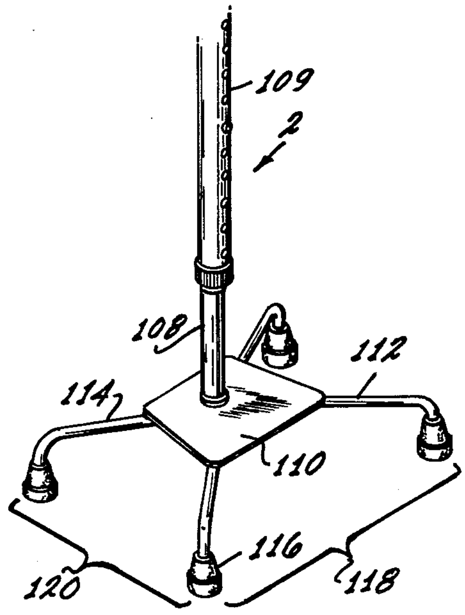
FIG. 5 is a partial pictorial view of a further embodiment of the invention in which the cane legs are longer to provide the cane with a larger and more stable support base.

As in the case of the walking aid canes described in FIGS. 1 through 4, the walking aid cane of FIG. 5 includes a support member 108 and a handle member 109 which is adjustably connected thereto. The support member 108 passes through a trapezoidal plate 110 with the plate, the inner legs 114 and the outer legs 112 being rigidly connected to each other and to the support member in the manner described in FIG. 2 to provide a strong and unitary structure. Similarly, resilient foot members 116 are secured to the extremities of outer legs 112 and inner legs 114 to prevent slippage of the walking aid cane on a supporting surface. Also, the trapezoidal plate 110 functions to equalize the resistance to bending, as between outer legs 112 and inner legs 114, by providing unsupported lengths of the outer legs which are substantially equal in length to the unsupported lengths of the inner legs.

The greater size of the rectangular base provided by the walking aid cane of FIG. 5 is illustrated by forward distance 118 which corresponds generally to the lengths of inner and outer sides 78 and the side distance 120, which corresponds to 80 and the lengths of front and rear sides 82 and 84 described with regard to FIG. 3. The forward distance 118 is greater than the lengths of inner and outer sides 78 and 80. Also, the side distance 120 is greater than the lengths of the front and rear sides 82 and 84 to provide a more stable base for the user, even though making the walking aid cane unsuitable for climbing stairs.

I claim:

1. A walking aid cane construction comprising:

a central support member having an upper end, a lower end and a longitudinal axis;

four legs rigidly connected to said lower end for contact with a supporting surface;

each of said legs having a body portion and a foot portion;

the body portions of said legs being generally transversely connected to said member with the foot portions depending downwardly from the outer ends of the body portions for contact with a supporting surface;

said support member having an inner region that faces the user's leg and an outer region that faces away from the user's leg;

said foot portions having lower ends which are positioned in a plane that is generally transverse to said support member with said lower ends positioned generally at the corners of a rectangle within said plane;

said support member having a front region which faces generally in the direction of movement of the user and a rear region which faces generally in a reverse direction to said direction of movement;

said rectangle having a front side and a rear side which are generally parallel and are positioned generally transverse to the direction of movement of the user;

said rectangle having an inner side and an outer side which are generally parallel and are positioned generally in alignment with the direction of movement of the user;

said inner side being positioned closer to the axis of said support member than said outer side and said front side and said rear side being positioned at about the same distance from the axis of said member;

said rectangle having inner corners formed by intersection of said inner side with said front and rear sides and outer corners formed by the intersection of said outer side with said front and rear sides;

the body portions of the legs which terminate at said inner corners being shorter than the body portions of the legs which terminate at said outer corners;

handle means adjustably connected to said support member for vertical positioning with respect thereto and being aligned with the direction of travel, and support means to provide support for supported lengths of said body portions with the support means being shaped and positioned to provide unsupported lengths of the body portions which have a substantially equal resistance to bending forces.

2. The cane construction of claim 1 wherein said legs and said support means form an integral structure.

3. The cane construction of claim 1 wherein said legs each have a substantially identical cross sectional configuration, and the unsupported lengths of said body portions are of substantially equal length.

4. The cane construction of claim 1 including means to change the position of the handle means with respect to the support member to convert the cane from a right-handed to a left-handed cane or vice versa by reversing the positions of the front and rear portions of the support member.

5. The cane construction of claim 1 including resilient foot members secured to the lower ends of said foot portions, and said foot portions being shaped and positioned to maximize frictional contact between said foot members and a supporting surface.

6. The cane construction of claim 1 wherein said support means includes a plate which contacts said legs along the supported lengths of the body portions thereof.

7. The cane construction of claim 6 wherein said plate includes a flange, and said plate is connected to said support member by connection through said flange.

8. The cane construction of claim 6 wherein said plate has a trapezoidal configuration in which opposite sides of said trapezoid which face generally along said direction of movement are generally parallel.

9. A walking aid cane construction comprising:

a support post having a lower end and an upper handle end, said handle being aligned in the direction of travel, four legs rigidly connected to said lower end;

each of said legs having a body portion and a foot portion;

the body portion of each leg being positioned generally transverse to said support post;

the foot portion of each leg depending downwardly from the body portion of each leg;

two of said legs being inner legs which are positioned adjacent one of the user's legs;

two of said legs being outer legs which are positioned on the opposite side of the support post from the user's legs;

the body portions of said outer legs being longer than the body portions of said inner legs, and the outer legs being positioned to provide greater resistance to tipping of the cane in the direction of the outer legs so as to prevent the user from falling.

10. The cane construction of claim 9 including handle means connected to the upper handle end of said support member, and means for vertically adjusting the position of the handle means relative to said support member with the handle means being adjustable downwardly to about the point of connection of said legs to said member.

11. The cane construction of claim 9 including resilient foot members secured to the lower ends of said foot portions, and said foot portions being shaped and positioned to maximize frictional contact between said foot members and a supporting surface.

12. The cane construction of claim 9 including means for generally equalizing the resistance of said legs to bending.

13. The cane construction of claim 12 wherein said legs and said means form an integral structure.

14. The cane construction of claim 12 wherein said means includes a plate which is secured to a supported length of the body portion of each leg.

15. The cane construction of claim 14 wherein said plate has a trapezoidal configuration.

16. The cane construction of claim 14 including a flange on said plate, and said plate being secured to said member through said flange.

* * * * *